(12) United States Patent
Arlotta et al.

(10) Patent No.: US 8,023,271 B2
(45) Date of Patent: Sep. 20, 2011

(54) SEALED EXPANSION MODULE

(75) Inventors: Angelo Arlotta, Ottawa (CA); Nicholas Adam Bundza, Ottawa (CA); Stefano De Cecco, Ottawa (CA); Peter Serjak, Stittsville (CA); Bevin Schmidt, Dunrobin (CA)

(73) Assignee: Alcatel Lucent, Paris (FR)

( * ) Notice: Subject to any disclaimer, the term of this patent is extended or adjusted under 35 U.S.C. 154(b) by 819 days.

(21) Appl. No.: 11/975,002

(22) Filed: Oct. 17, 2007

(65) Prior Publication Data

US 2009/0101382 A1 Apr. 23, 2009

(51) Int. Cl.
*H05K 5/00* (2006.01)
(52) U.S. Cl. .......................... 361/752; 361/730; 361/796
(58) Field of Classification Search .................. 361/752, 361/730, 790, 797, 800, 796; 312/223.1, 312/223.2; 385/14, 53, 76, 99, 100–103, 385/107, 109, 113, 134–137
See application file for complete search history.

(56) References Cited

U.S. PATENT DOCUMENTS

| | | | | |
|---|---|---|---|---|
| 5,267,122 A * | 11/1993 | Glover et al. | ................. | 361/704 |
| 5,930,111 A * | 7/1999 | Yamazaki et al. | ............ | 361/690 |
| 7,110,653 B2 * | 9/2006 | Sobel et al. | ................... | 385/135 |
| 7,450,382 B1 * | 11/2008 | Fischer et al. | ................. | 361/695 |
| 2006/0153516 A1 * | 7/2006 | Napiorkowski et al. | ...... | 385/135 |

\* cited by examiner

*Primary Examiner* — Hung S Bui
(74) *Attorney, Agent, or Firm* — Galasso & Assoc. L.P.

(57) ABSTRACT

Improved Sealed Expansion Module is an enclosure for housing electronics, such as circuit boards, POTS/VDSL cables having connectors, a fiber cable having a connector and a power cable having a connector. The preferred embodiment of Improved Sealed Expansion Module is comprised of at least some of the following: an enclosure having two internally undivided chambers (upper and lower), an access hatch attached with captive fasteners to the lower chamber of the enclosure, circuit boards located in the upper chamber of the enclosure, a surge protector and POTS/VDSL, fiber and power cables with connectors within the lower chamber of the enclosure, and a plurality of openings on the bottom of the lower chamber for POTS/VDSL interconnection cables, fiber interconnection cables, power interconnection cables at customer sites.

6 Claims, 4 Drawing Sheets

SEALED EXPANSION MODULE

CROSS REFERENCE TO RELATED APPLICATIONS

This United States Non-Provisional Patent Application does not claim priority to any United States Provisional Patent Application or any foreign patent application.

FIELD OF THE DISCLOSURE

The disclosures made herein relate generally to the optical network unit (ONU) industry and sealed expansion module (SEM) industry. The invention discussed herein is in the general classification of optical network unit modules and sealed expansion modules.

BACKGROUND

An ONU is a device in which optical-to-electrical conversions take place. ONU's are usually installed close to a customer's home or office and connected to central offices by optical fibers and/or copper pairs. Signals received from these optical fibers and copper pairs are converted into electrical signals that are then transmitted along electrical conductors or coaxial cables to the customers' premises.

Electrical signals, in the frequency range above the voice band, received from the customers are converted by the optical network units into optical signals which are transmitted by the optical fibers to the central office. Electrical signals in the voice band received from the customer are transmitted to the central office on the copper pairs.

ONU's are located just adjacent to the outside wiring interface at a customer site. This outside wire interface connects the ONU to the customer's line to transfer the voice, data, video, high definition broad band and XDSL signals to the customer. Because ONU's are located outside a customer's premises, they are contained in a housing, enclosure or module for protection from the weather and other external forces.

An SEM is a sealed enclosure that can be mounted in a variety of locations and protects a variety of electronics equipment from the elements. Traditional SEM designs are shown in FIG. 1 and FIG. 2.

Unfortunately, conventional mechanical designs of Sealed Expansion Modules ("SEM") and Optical Network Unit ("ONU") enclosures impose many deployment restrictions. As shown in FIG. 1, many legacy SEM's are installed with variable length cable spools that are difficult to ship because of the shape and design of the cable spools. These SEM's are also expensive because any cabling in excess of what is required for a given installation becomes an unnecessary expense.

As shown in FIG. 2, some legacy SEM's are deployed with factory sealed and installed, fixed length Drop/Co/VDSL/power/fiber cables solving the shipping and cost issues associated with cable spools. However, these SEM's require an additional junction box to connect the cable pigtails to the in-ground cabling, making them more difficult to install and leading to increased costs and reduced reliability due to the additional connections inside the junction box.

The fixed length cables also may restrict the distance the enclosure can be placed from the SAI or fiber junction. Alternatively, the fixed length cables require intimate knowledge of the deployment site to pre-terminate the cables to an appropriate length.

U.S. Pat. No. 5,828,807 discloses an ONU mechanical enclosure having two compartments with separate openings. One compartment houses the electronics and optics of the optical network unit, and the second compartment houses a drop terminal block or blocks of the unit. Doors cover and seal the openings when the unit is in use. The doors can be rotated upwards when the interior of the optical network needs to be accessed. Catches hold the doors in open positions to allow the technician freedom to use both hands.

U.S. Pat. No. 5,828,807 and other prior ONU mechanical enclosures insist that the dual compartment/separate enclosures are desirable because separate doors and compartments allow craftspersons to access the desired compartment without unnecessarily exposing the electronic elements in the other compartment to weather elements. The prior art ignores the additional costs associated with manufacturing dual compartments and the additional costs and logistical concerns of installing a bulkier dual compartment ONU enclosure.

These types of ONU enclosures suffer numerous other drawbacks as discussed in United States patent application Ser. No. 2003/0118312. One such drawback is that the internal environment for the electronics and optical components is not controlled. Hence, during servicing of the appropriate compartments, humidity and wind driven rain can enter the compartment and be trapped therein when the door is closed. Potential corrosion of electronic components and/or shorting out of the power supply can occur as a result.

Another drawback of existing ONU mechanical enclosures is that human error during servicing often occurs because line cards within the ONU mechanical enclosures are often mistakenly identified as damaged and accidentally exchanged. This results in unnecessary delays in returning an ONU to its intended function and may exacerbate the problem.

The technology discussed in United States patent application Ser. No. 2003/0118312 addresses these problems by providing for a housed environmentally sealed printed circuit board/line card such that environmental conditions cannot affect optical and electronic components. The printed circuit boards/line cards also are not changed individually so that an incorrect circuit board will not be replaced when the service breaks down. Instead, when problems occur, the entire environmentally sealed printed board arrangement is replaced for a new one. However, the device described in United States patent application Ser. No. 2003/0118312 still requires two separate sealed compartments for cable termination and active electronics, limiting possible installation sites and creating added installation expenses.

Hence, there is a need in the art for a convenient to install, reliable, inexpensive, durable, safe and effective SEM or module for protecting an ONU that does not require two separate sealed compartments for cable termination and active electronics and does not require expensive variable length cable spools or mounting-limiting fixed-length cables.

SUMMARY OF THE DISCLOSURE

Improved Sealed Expansion Module is an enclosure for housing electronics and POTS/VDSL, fiber, and power cabling terminations.

The preferred embodiment of the invention utilizes a singular, sealed expansion module having a singular hatch providing access to the electronics, a surge protection device and POTS/VDSL, fiber and power cabling terminations.

Alternative embodiments of the invention may incorporate a variety of circuit boards and line cards.

The principal object of this invention is to provide an expansion module or enclosure for protecting an ONU or other electronics that does not require two separate sealed compartments-one for cable termination and one for active electronics-and does not require expensive variable length cable spools or mounting-limiting fixed-length cables.

Another object of this invention is to provide a module that supports the field termination of 24-line or greater fiber-to-the-node (FTTN).

Another object of this invention is to provide a module that is sealed to prevent exposure to the elements.

Another object of this invention is to provide a module that allows for a variety of types of mounting, including pole, wall, strand and pedestal.

Another object of this invention is to provide an expansion module or other module for protecting an ONU or the like that is relatively inexpensive to install and maintain.

Another object of this invention is to provide a relatively inexpensive to manufacture and ship sealed expansion module or module for protecting an ONU that does not require two separate sealed compartments for cable termination and active electronics and does not require expensive variable length cable spools or mounting-limiting fixed-length cables.

Another object of this invention is to provide a relatively small sealed expansion module or module for protecting an ONU or the like that permits more installation flexibility by allowing multiple modules to be located on a single pedestal when that is desirable.

Another object of this invention is to provide an easily installed sealed expansion module or module for protecting an ONU that does not require two separate sealed compartments for cable termination and active electronics and does not require expensive variable length cable spools or mounting-limiting fixed-length cables.

Another object of this invention is to provide a reliable and safe sealed expansion module or module for protecting an ONU that does not require two separate sealed compartments for cable termination and active electronics and does not require expensive variable length cable spools or mounting-limiting fixed-length cables.

Yet another object of this invention is to provide a durable sealed expansion module or module for protecting an ONU that is resistant to weather and other external forces.

DETAILED DESCRIPTION OF THE DRAWINGS

Figure 1:
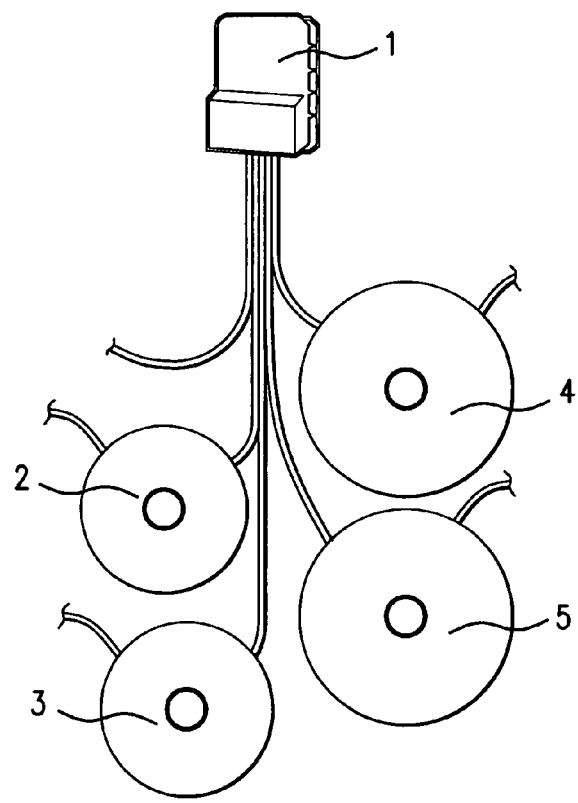
FIG. 1 depicts a perspective view of a legacy SEM with attached variable length cable spools.

FIG. 1 depicts a perspective view of a legacy SEM with attached variable length cable spools. The module 1 is approximately rectangular and contains various electronics components. The module 1 has openings (not pictured) on the bottom to permit cables operatively connected to these electronics components to emerge through the module 1. A variety of digital subscriber lines at a customer's office or business can then be connected with the cables from the module 1.

The cables from the module 1 are stored on a first cable spool 2, a second cable spool 3, a third cable spool 4 and a fourth cable spool 5 in this embodiment. The spools are designed to hold cable lengths sufficient for most installations. These spools and the excess cabling left after installation, however, represent an additional cost and create difficulties with storage and shipping.

Figure 2:
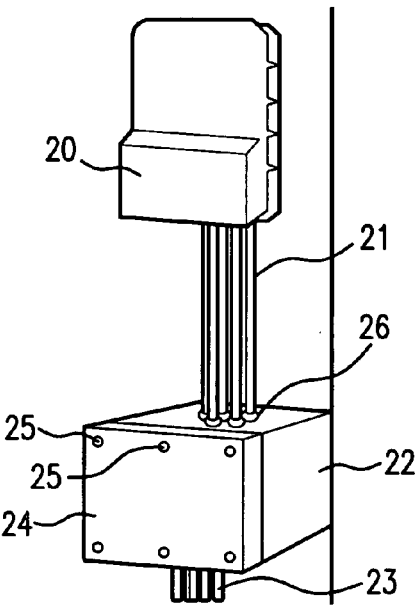
FIG. 2 depicts a perspective view of a legacy SEM with factory-attached cable pigtails and a secondary junction box.

FIG. 2 depicts a perspective view of a legacy SEM with factory-attached cable pigtails and a secondary junction box. This module 20 is also approximately rectangular and has openings (not pictured) on the bottom. The module 20 contains various electronics components and the openings permit cable pigtails 21 operatively connected to these various electronics components to be attached through the module 20 to a variety of digital subscriber lines at a customer's office or business through a secondary junction box 22.

The cable pigtails 21 are fixed length and factory set, dictating the distance the secondary junction box 22 can be set from the module 20. The secondary junction box 22 provides the connection capabilities necessary to operatively connect the cable pigtails 21 to the in-ground cabling 23 at the customer site. The secondary junction box 22 is approximately rectangular and has an access panel 24 attached with captive fasteners 25 to permit an installer or repairman to access the connections. The secondary junction box 22 has openings 26 on the top to allow the cable pigtails 21 coming from the module 20 to enter the secondary junction box 22. The secondary junction box 22 also has openings (not pictured) on the bottom to permit the in-ground cabling 23 to enter the junction box 22.

The present invention is designed to avoid the excess cabling and spooling and to eliminate the need for the secondary junction box required for traditional SEM's. The preferred embodiment of Improved Sealed Expansion Module is comprised of at least some of the following: an enclosure having two internally undivided chambers (upper and lower), an access hatch attached with captive fasteners to the lower chamber of the enclosure, circuit boards located in the upper chamber of the enclosure, a surge protector and POTS/VDSL, fiber and power cables with connectors within the lower chamber of the enclosure, and a plurality of openings on the bottom of the lower chamber for POTS/VDSL interconnection cables, fiber interconnection cables, and power interconnection cables at customer sites.

Figure 3:
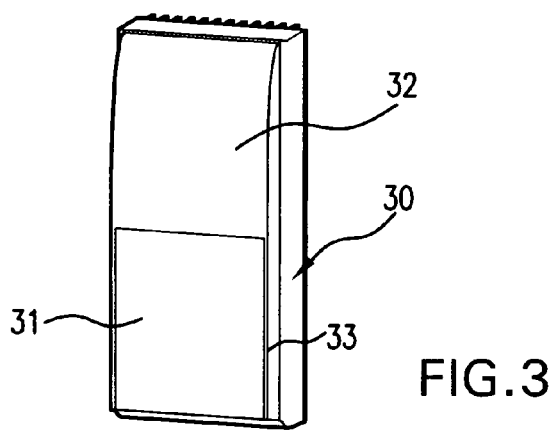
FIG. 3 depicts a perspective view of the preferred embodiment of the present invention.

FIG. 3 depicts a perspective view of the preferred embodiment of the present invention. An enclosure 30 is visible with an access hatch 31 attached to the front. The enclosure 30 has an upper chamber 32 and a lower chamber 33, but it is undivided internally. The enclosure 30 and the access hatch 31 are approximately rectangular in shape and made of metal though neither the shape nor the material is absolutely critical to the invention. Interconnection cables can protrude through holes (not shown) in the bottom of the lower chamber 33.

Figure 4:
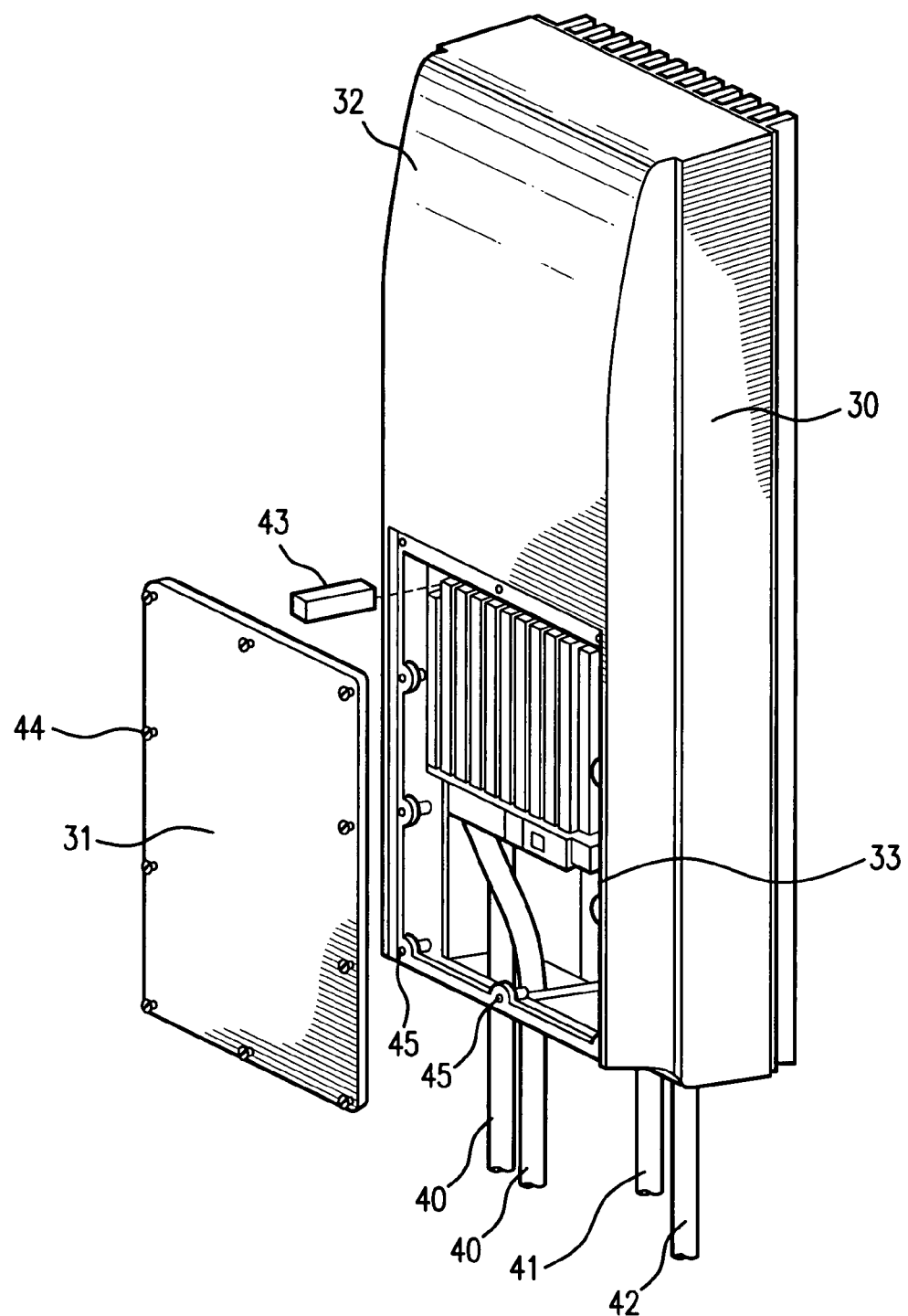
FIG. 4 depicts a perspective view of the preferred embodiment of the present invention with the access hatch removed.

FIG. 4 depicts a perspective view of the preferred embodiment of the present invention with the access hatch removed. Because the enclosure 30 is undivided internally, there is no solid physical partition inside the enclosure 30 to divide the upper chamber 32 and the lower chamber 33 in this preferred embodiment. The enclosure 30 must be undivided, meaning it permits cables to pass from the upper chamber 32 to the lower chamber 33 for connection with in-ground cabling. The upper chamber 32 houses circuit boards while the lower chamber 33 covered by the access hatch 31 houses a variety of cabling connectors among other electronic components in this preferred embodiment.

A surge protector 43 is one of the additional electronic components contained in the lower chamber 33 of the preferred embodiment. The surge protector 43 is designed to protect the electronic components within the enclosure 30 from damage due to power surges and voltage spikes. The surge protector 43 is shown removed from its location in the lower chamber 33 of the enclosure 30 for greater clarity.

The access hatch 31 is attached to the lower chamber 33 through the use of captive fasteners. In the preferred embodiment shown, a set of ten screws 44 can be inserted through a set of ten holes located around the perimeter of the access hatch 31 and into receptacles 45 appropriately spaced around the perimeter of the lower chamber 33 to accept the screws 44. The screws 44 are spaced evenly around the perimeter of the access hatch 31 in this preferred embodiment to affect a consistent and firm seal of the lower chamber 33 to protect the electronic components contained therein.

Alternatively, the access hatch could be hinged to the enclosure on the top or bottom to allow easy access to at least the components located within the lower compartment. In this alternative embodiment, the access hatch would utilize a latching device on the bottom or top (opposite the hinge) to secure and lock the access hatch in place against the enclosure.

Interconnection cables enter the enclosure 30 through holes (not shown) on the underside of the enclosure 30. These interconnection cables allow for universal site deployment of the unit and consist of POTS/VDSL cables 40, fiber cable 41, and power cable 42 in the preferred embodiment shown, but could include a variety of other cabling as well.

Rather than having variable length cables on spools or fixed length pigtails connecting to a junction box dictating the location of the enclosure 30, the POTS/VDSL cables 40, fiber cable 41, and power cable 42 connect through openings in the lower chamber 33 of the enclosure 30 to the POTS/VDSL cabling connectors (not pictured), fiber cabling connector (not pictured) and power cable connector (not pictured) within the enclosure 30. The POTS/VDSL cabling connectors, fiber cabling connector and power cabling connector are operatively attached to cables that operatively connect to the circuit boards within the enclosure 30.

Figure 5:
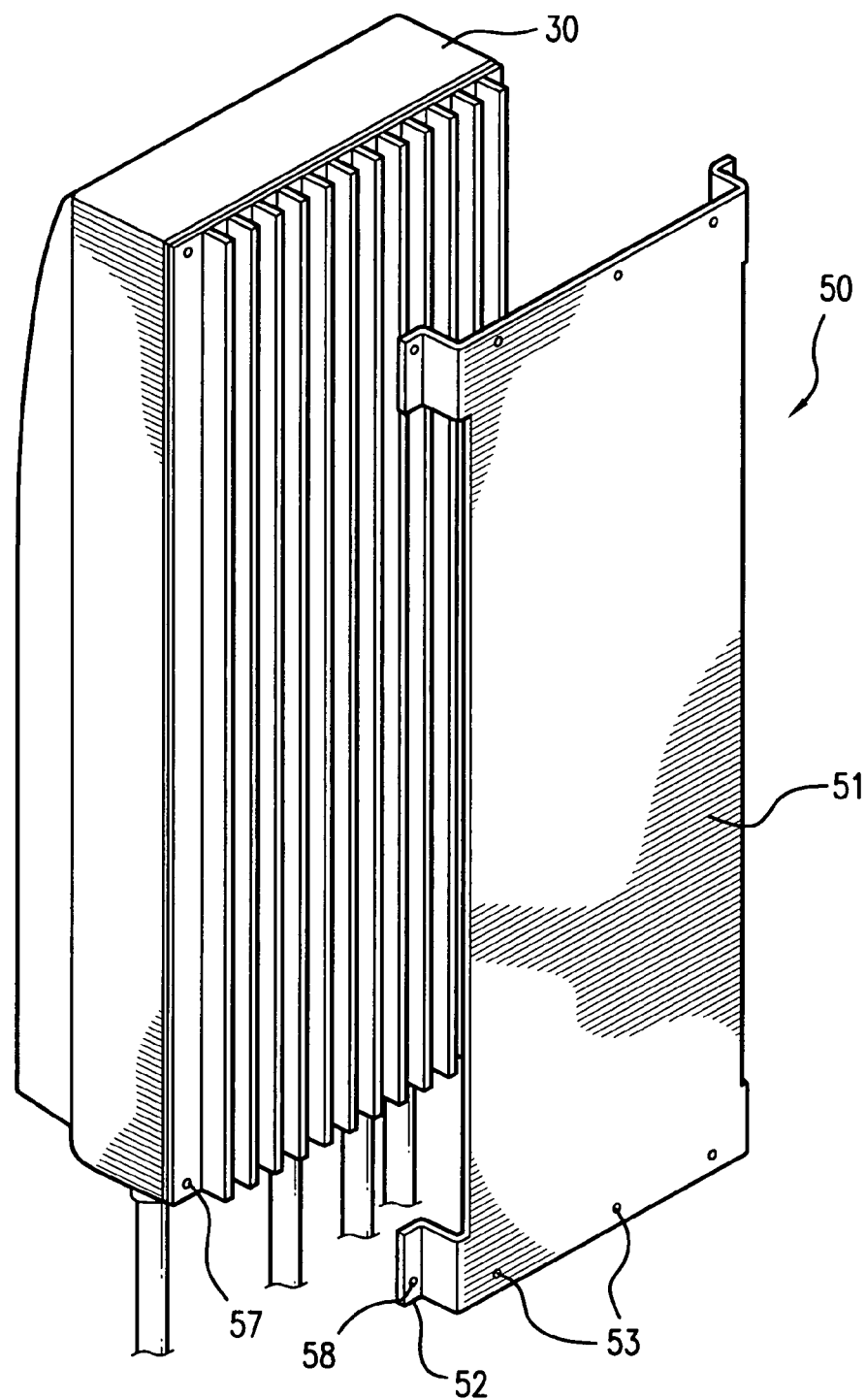
FIG. 5 depicts a perspective view of the rear of the preferred embodiment of the present invention with the mounting bracket detached.

FIG. 5 depicts a perspective view of the rear of the preferred embodiment of the present invention with the mounting bracket detached. The enclosure 30 is mounted to a wall or other location using conventional mounting techniques. In this preferred embodiment, the mounting bracket 50 has a back 51 and tabs 52 in each corner of the back 51 and is dimensioned to receive the enclosure 30. The mounting bracket 50 also has a plurality of holes 53 on the back 51 and a single hole 58 on each of the tabs 52. Screws (not shown) that correspond with the plurality of holes 53 permit the mounting bracket 50 to be firmly attached to a wall or other suitable site. The single hole 58 on each of the tabs 52 aligns with a single hole 57 in each corner of the back of the enclosure 30 to permit the mounting bracket 50 to attach to the enclosure 30.

Figure 6:
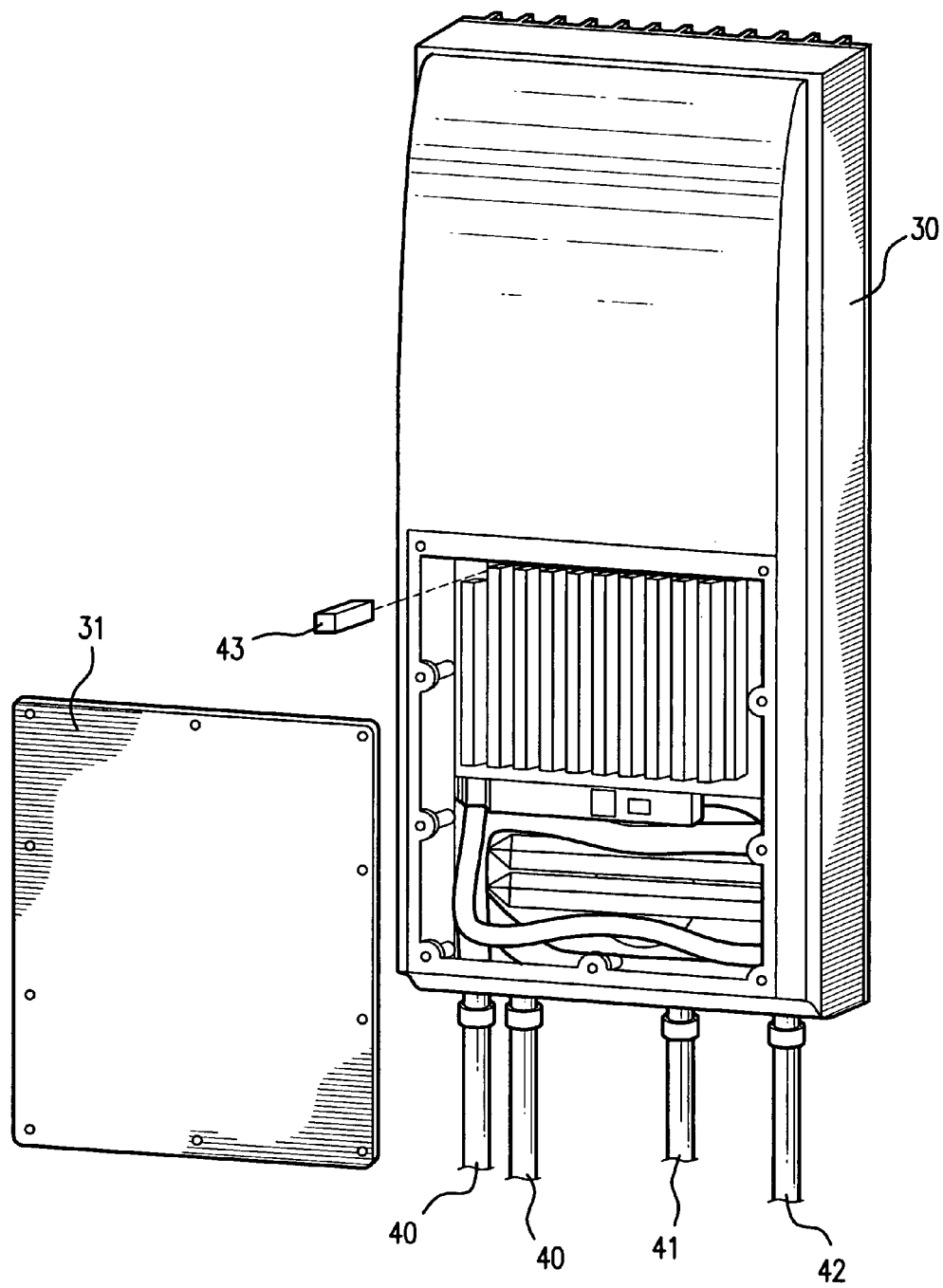
FIG. 6 depicts a front view of the preferred embodiment of the present invention with the access hatch removed and cabling connectors connected.

FIG. 6 depicts a front view of the preferred embodiment of the present invention with the access hatch removed and cabling connectors connected. The POTS/VDSL cabling connectors, fiber cabling connector and power cabling connector are attached to the POTS/VDSL cables 40, fiber cable 41, and power cable 42, respectively, within the enclosure 30. The surge protector 43 is also visible removed from the enclosure 30. The access hatch 31 is removed from the enclosure 30 to clearly show how the various cabling connectors can be conveniently attached to the cables and protected inside the enclosure 30

Certain embodiments of the invention could also utilize the environmentally sealed printed circuit boards discussed in U.S. patent application Ser. No. 2003/0118312 to protect them from weather elements during servicing/installation of the POTS/VDSL cables, fiber cable and power cable.

To use the preferred embodiment of Improved Sealed Expansion Module, an individual would first select a suitable deployment site and determine whether pole, wall, strand or pedestal mounting is most appropriate for the desired location. The enclosure is then mounted at the desired location and the access hatch is removed by unthreading the screws from their receptacles. The POTS/VDSL cables, fiber cable, and power cable at the customer site are connected through the openings in the lower chamber of the enclosure to the POTS/VDSL cabling connectors, fiber cabling connector, and power cable connector within the enclosure. The access hatch can then be reattached to the enclosure using the screws and accompanying receptacles.

The materials utilized for Improved Sealed Expansion Module may vary widely but will likely include metal, plastic and electronic components. The metals used for the enclosure would ideally be selected from available steel or alloys of steel and aluminum. The production process related to the use of these metals insures that the metal is non-corrosive, durable and strong. The selected metal should have high impact strength and be capable of accepting and retaining coloring materials for an extended length of time.

The plastic used in the production of the enclosure or other components will ideally be selected for durability and longevity. Thermoplastics are commonly used in the manufacturing of components similar to those used in this invention. Polyethylene, polypropylene, and other similar thermoplastic materials would be among those with the necessary traits. Members of this family are recognized universally as being versatile and of high quality.

The plastic components of Improved Sealed Expansion Module can also be formed with the use of plastic molding techniques, such as injection molding or blow molding. Injection molding requires melted plastic to be forcefully injected into relatively cool molds. As the plastic begins to harden, it takes on the shape of the mold cavity. This technique is ideal for the mass production of products. Alternatively, blow molding, a form of extrusion, could be utilized. Blow molding involves a molten tube being pushed into a mold. Compressed air then forces the molten tube against the cold walls of the mold.

It should be obvious that the components of the present invention can be of various shapes and sizes. It should also be obvious that the components of the invention can be made of different types of plastics, metals or other suitable materials and can be of any color.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:
1. An expansion module comprising:
 (a) a singular enclosure having an upper chamber and a lower chamber that are undivided internally and containing a circuit board in the upper chamber that is operatively connected to a fiber cable, a fiber cabling connector, a power cable, a power cabling connector, a first POTS/VDSL cable, a first POTS/VDSL power cabling connector, a second POTS/VDSL cable, a second POTS/VDSL cabling connector and a surge protector in the lower chamber; and (b) a fiber interconnection cable, a power interconnection cable, a first POTS/VDSL interconnection cable and a second POTS/VDSL interconnection cable attachable to the fiber cabling connector, the power cabling connector, the first POTS/VDSL cabling connector, and the second POTS/VDSL cabling connector.

2. The module of claim 1 further comprising
an access hatch attached to the singular enclosure.

3. The module of claim 2 wherein the access hatch is hinged to the top of the singular enclosure which has a latching device on the bottom of the singular enclosure.

4. The module of claim 2 wherein the access hatch is attached to the singular enclosure through the use of a plurality of screws placed through the access hatch and a plurality of corresponding screw receptacles on the singular enclosure.

5. The module of claim 1 further comprising
a mounting bracket having a back and a set of tabs dimensioned to receive the singular enclosure.

6. A sealed expansion module:

(a) a singular enclosure having an upper chamber and a lower chamber that are undivided internally and containing a circuit board in the upper chamber that is operatively connected to a fiber cable, a fiber cabling connector, a power cable, a power cabling connector, a first POTS/VDSL cable, a first POTS/VDSL power cabling connector, a second POTS/VDSL cable, a second POTS/VDSL cabling connector and a surge protector in the lower chamber;

(b) an access hatch attached to the singular enclosure through the use of a plurality of screws through the access hatch and a plurality of corresponding screw receptacles on the lower chamber of the singular enclosure; and (c) a fiber interconnection cable, a power interconnection cable, a first POTS/VDSL interconnection cable and a second POTS/VDSL interconnection cable attachable to the fiber cabling connector, the power cabling connector, the first POTS/VDSL cabling connector, and the second POTS/VDSL cabling connector through a plurality of holes in the bottom of the lower chamber of the singular enclosure; and (d) a mounting bracket having a back and a set of tabs dimensioned to receive the singular enclosure.

* * * * *